United States Patent
Watanabe et al.

(10) Patent No.: US 8,958,117 B2
(45) Date of Patent: Feb. 17, 2015

(54) RECORDING MEDIUM HAVING POST-PROCESSING PROHIBITION PROGRAM STORED THEREON, PRINT CONTROL DEVICE, AND PRINT CONTROL SYSTEM

(75) Inventors: Mie Watanabe, Tokyo (JP); Takashi Toriumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

(21) Appl. No.: 13/460,958

(22) Filed: May 1, 2012

(65) Prior Publication Data

US 2012/0307261 A1  Dec. 6, 2012

(30) Foreign Application Priority Data

Jun. 6, 2011 (JP) ................. 2011-126598

(51) Int. Cl.
 *G06K 15/02* (2006.01)
 *G06F 3/12* (2006.01)
 *G06K 15/00* (2006.01)

(52) U.S. Cl.
 CPC .......... *G06F 3/1204* (2013.01); *G06K 15/1823* (2013.01); *G06K 15/4065* (2013.01); *G06K 15/4025* (2013.01); *G06F 3/1252* (2013.01); *G06F 3/1255* (2013.01); *G06F 3/1288* (2013.01); *G06K 2215/0082* (2013.01)
 USPC .............. 358/1.2; 399/82; 399/407; 399/408; 399/410; 709/203

(58) Field of Classification Search
 CPC .......... G03G 2215/00814; G03G 2215/00827; G03G 15/6544; G06F 3/1204; G06F 3/1252; G06F 3/1255; G06F 3/1288; G06K 15/4025; G06K 15/4065; G06K 15/1823
 USPC .................. 358/1.2, 1.19; 399/410
 See application file for complete search history.

(56) References Cited

U.S. PATENT DOCUMENTS

| | | | |
|---|---|---|---|
| 2002/0090223 A1* | 7/2002 | Ohtani ......................... | 399/410 |
| 2003/0041102 A1* | 2/2003 | Simpson et al. .............. | 709/203 |
| 2004/0252340 A1* | 12/2004 | Komagamine et al. ...... | 358/1.18 |
| 2010/0165377 A1* | 7/2010 | Has .............................. | 358/1.15 |
| 2010/0302565 A1* | 12/2010 | Tanaka ......................... | 358/1.9 |
| 2011/0164282 A1* | 7/2011 | Okada et al. ................. | 358/1.15 |
| 2011/0292437 A1* | 12/2011 | Tombs et al. ................ | 358/1.15 |

FOREIGN PATENT DOCUMENTS

| | | |
|---|---|---|
| JP | 2002-281278 A | 9/2002 |
| JP | 2009-134440 A | 6/2009 |

* cited by examiner

*Primary Examiner* — Benny Q Tieu
*Assistant Examiner* — Juan M Guillermety
(74) *Attorney, Agent, or Firm* — Harness, Dickey & Pierce P.L.C.

(57) ABSTRACT

A print control device includes a prohibition determination unit, when a first sheet size of a sheet stored in a printing device is different from a second sheet size designated by an operator, preventing, when determining that the second sheet size of the sheet can be generated by cutting the sheet having the first sheet size, an execution of a post process function other than cutting in the printing device; and a workflow generation unit generating a workflow including operational steps of causing a cutting device to cut the sheet having the first sheet size to obtain the sheet having the second sheet size, and causing a functional device other than the cutting device to perform the post process function on the printing output after cutting the sheet having the first sheet size.

9 Claims, 7 Drawing Sheets

FIG.5

| SHEET SIZE BEFORE CUTTING | POSSIBLE SHEET SIZE AFTER CUTTING |
|---|---|
| A3 | A4,A5 |
| B4 | B5 |
| A4 | A5 |
| A5 | N/A |
| B5 | N/A |

RECORDING MEDIUM HAVING POST-PROCESSING PROHIBITION PROGRAM STORED THEREON, PRINT CONTROL DEVICE, AND PRINT CONTROL SYSTEM

CROSS-REFERENCE TO RELATED APPLICATIONS

The present application claims priority under 35 U.S.C §119 based on Japanese Patent Application No. 2011-126598 filed on Jun. 6, 2011, the entire contents of which are hereby incorporated herein by reference.

BACKGROUND OF THE INVENTION

1. Field of the Invention

The present invention generally relates to a print control device, a print control system, and a recording medium storing a print control program.

2. Description of the Related Art

Recently, in the commercial printing industry, a so-called Print On Demand (POD) market has been showing up. In the POD market, a relatively small amount of printings is required to be delivered to the customer within a relatively short time period. Further, in the POD market, such a relatively small amount of printings may be requested from plural clients at the same time.

In such a case, in the POD market, a commercial printing company may receive various types of manuscripts of the printings having different printing conditions at the same time. Under such a variety of conditions, to yield an appropriate profit, it may be necessary to improve the efficiency of the printing operations.

SUMMARY OF THE INVENTION

According to an aspect of the present invention, a print control device includes a prohibition determination unit and a workflow generation unit.

The prohibition determination unit, when a first sheet size of a sheet stored in a printing device is different from a second sheet size designated by an operator to generate a printing output, determines whether the second sheet size of a sheet can be generated by cutting the sheet having the first sheet size stored in the printing device, and prevents, when determining that the second sheet size of the sheet can be generated by cutting the sheet having the first sheet size, an execution of a post process function other than cutting in the printing device.

The workflow generation unit generates a workflow including operational steps of: arranging drawing data of the printing output on the sheet having the first sheet size so that the drawing data arranged are adapted to the second sheet size, causing the printing device to print the drawing data, causing a cutting device to cut the sheet having the first sheet size to obtain the sheet having the second sheet size, and causing a functional device other than the cutting device to perform a post process on the printing output after cutting the sheet having the first sheet size.

BRIEF DESCRIPTION OF THE DRAWINGS

Other objects, features, and advantages of the present invention will become more apparent from the following description when read in conjunction with the accompanying drawings, in which:

FIG. 5 is a table illustrating a relationship between sheet sizes before cutting and the corresponding sheet sizes after cutting;

DETAILED DESCRIPTION OF THE PREFERRED EMBODIMENTS

Figure 1:
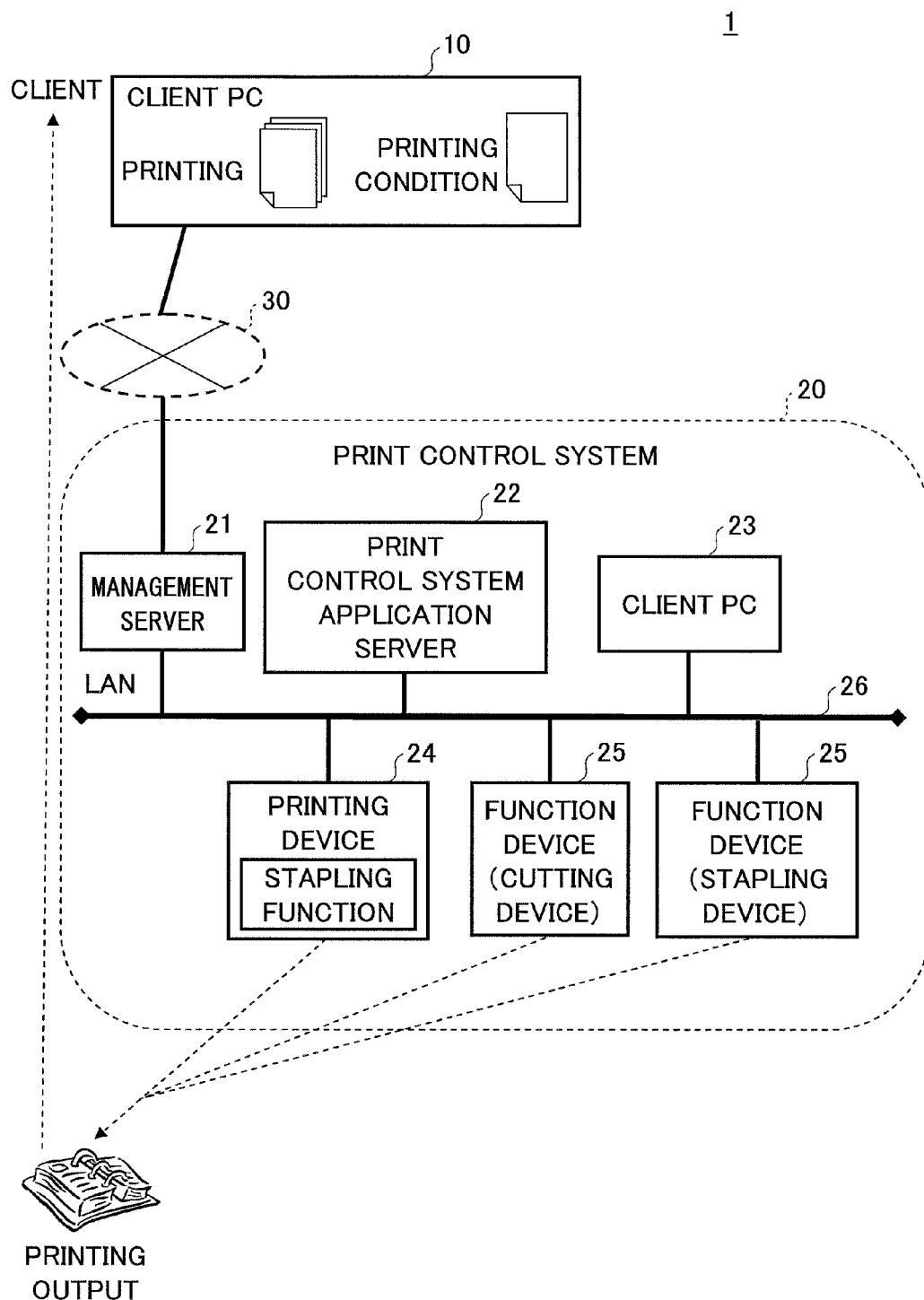
FIG. 1 is a drawing illustrating an example configuration of a system including a print control system according to an embodiment of the present invention.

In the POD market where a relatively small amount of printings is required to be delivered to the customer within a relatively short time period, it may be necessary to improve the efficiency of the printing operation so as to acquired appropriate profit.

As one of the methods to improve the efficiency of the printing operation, it may be desired to reduce the down time in the printing operation. For example, the down time may include the following case.

Basically, a commercial printing company (hereinafter "printing company") performs a pre-press operation based on requests (i.e., printing conditions and the like) from a client, and then performs a printing process.

However, in a case where the printing conditions designated in the pre-press operation do not coincide with the conditions actually set in a printing device, even when the print job is entered (introduced), an error may occur and no data may be printed.

In this case, the printing company may perform the printing process by changing either the printing condition designated in the pre-press operation or the condition set in the printing device so that the conditions therebetween coincide with each other to escape from the error condition.

As described above, when the error occurs, the printing process remains interrupted until either the printing condition designated in the pre-press operation or the condition set in the printing device is appropriately changed. Namely, the down time occurs in the printing site. Furthermore, the down time may become longer as long as an operator may not recognize the occurrence of the error.

As a specific example where the down time occurs, when a client requests A4 size printing and an operator designates the A4 size printing in the pre-press operation but the sheet size set in the printing device is A3 size, due to the difference between the conditions, the printing operation may be interrupted (stopped).

Further, in a case where only one operator is assigned to the operation and the site where the pre-press operation is performed by the operator is located far from the site where the printing device is installed, the operator may not easily recognize the difference of the settings of the sheet size.

In such a case, the operator may not recognize the difference of the settings until the issuance of the corresponding error message. Because of the delayed recognition, the down time may further be increased.

In the above case, generally, the setting of the sheet size set in the printing device may be changed from the A3 size to the A4 size so that the sheet sizes therebetween coincide with each other to resume the printing operation.

However, if the site where the pre-press operation is performed by the operator is far from the site where the printing device is installed, it may take time for the operator to move back and forth between the sites and replace the sheets stacked (stored) in the printing device.

Further, to make matters worse, if there are no A4 size sheets available in the printing site, the printing operation may not be resumed until the A4 size sheets are obtained (after purchasing or the like).

In the above case, the A4 size printing may be generated (performed, printed) by printing two pages of A4 size printing data of the client requests on a single A3 size sheet and cutting the center part of the A3 size sheet.

In the above case, when attention is paid to the printing process, the two pages of the A4 size printing data are arranged on the single A3 size sheet in the 2Up mode in the pre-press operation.

Then, the printing setting for the A3 size sheet and the setting of cutting the center part of the A3 size sheet after printing are set. Then, the print job is generated, and transmitted to the printing device.

Further, the above case is in the state where the A3 size sheets are stacked. Therefore, when the print job including the printing setting of the A3 size sheet is received, due to the coincidence of the sheet size, the printing process may be performed without any error occurring.

In the above case, after the printing data are printed on the A3 size sheet, the center part of the A3 size sheet is cut by a cutting device connected (mounted, provide) in the printing device. By doing this, the printing of two sheets of the A4 size sheets may be generated (acquired). By the series of (successive) operations, it may become possible to generate the A4 size printings based on the client requests without incurring down time.

Further, there has been known a printing method called multiple image printing where plural different manuscripts are imposed on the same sheet and printed. Further, it is also known that after different manuscripts are imposed on the same sheet and printed, the printed sheet is cut by a cutting device to generate (acquire) a desired printing (see, for example, Japanese Laid-open Patent Application No. 2009-134440).

However, as described above, in the case where different manuscripts imposed on the same sheet are printed and cut by the cutting device to generate the printing, when the printing device has a post process function such as a punching or a stapling function other than the cutting function by the cutting device, the printing device may perform the post process function such as the punching or the stapling function other than the cutting function on the printing at the position determined by assuming that the printing has the sheet size existing before the sheet is cut by the cutting device.

The present invention is made in light of the above circumstances, and may provide a print control device, a print control system, and a recording medium storing a print control program which prevent the post process function other than cutting from being performed on the sheet which has not been cut.

Next, embodiments of the present invention are described with reference to the accompanying drawings.

Outline

In a print control system according to an embodiment, with respect to a print job in a case where the sheet size set in the printing device differs from the sheet size designated by an operator to generate the printing, the following features are provided.

In the print control system in this embodiment, when it is possible for the operator to cut a sheet (sheets) provided (stacked) in the printing device into a sheet (sheets) having a desired sheet size to generate a printing, the layout adapted to the size of the image data on the sheet provided in the printing device is determined and the printing is performed. Then, after the printing, the sheet is cut by a cutting device in accordance with the determined layout.

In other words, in the print control system in this embodiment, for example, it is possible to treat a sheet having a smaller size (e.g., A4 size sheet) generated by cutting a sheet (sheets) having a larger (greater) size (e.g., A3 size sheet) actually provided in the printing device as if the sheet having the smaller size (e.g., A4 size sheet) is also provided in the printing device.

Further, in the print control system in this embodiment, when a post process function other than the cutting function is performed (provided), the post process function including a punching function or a stapling function, it is possible to prevent (prohibit) the post process function other than the cutting function. By doing this, it may become possible to prevent the generation of a workflow in which the post process function other than the cutting function is performed before the cutting the sheets (cutting process is performed).

Namely, in the print control system in this embodiment, it may become possible to generate a workflow in consideration of the prohibition against performing any post process other than the cutting process on the sheet before the cutting process is performed on the sheet.

In the print control system in this embodiment, by having the features described above, it may become possible to generate a workflow in consideration of the prevention that prevents the performance of the post process functions other than the cutting function on the sheets that have not been cut.

Entire Configuration of Print Control System

FIG. 1 illustrates an example configuration of a system 1 including a print control system 20 in this embodiment. As illustrated in FIG. 1, the system 1 includes a client Personal Computer (PC) 10 and the print control system 20 connected to the client PC 10 via a network 30. The client PC 10 is used by a client. The print control system 20 is typically used by an operator of a printing company.

Further, as illustrated in FIG. 1, the print control system 20 includes a management server 21, a print control system application server 22, a client PC 23, a printing device 24, function devices 25, and a network 26 such as a Local Area Network (LAN).

The management server 21, the print control system application server 22, the client PC 23, the printing device 24, and the function devices 25 are connected to each other via the network 26. Further, the function device 25 may be connected to the printing device 24. The function devices 25 may not be connected to the network 26.

The management server 21 manages the manuscripts received from clients as the printings. Further, the management server 21 generates a Job Definition Format (JDF) defining the printing conditions. The JDF may also be called a "job ticket". Further, the management server 21 may have the same functions as those of a server which may be called a Management Information System (MIS).

The print control system application server 22 includes the print control system. Further, the client PC 23 is used by an operator so that the operator operates the functions of the print control system 20 and performs printing operations. The printing device 24 performs (prints) a print job and generates printing output.

Two or more printing devices 24 may be connected to the network 26. The printing device 24 has a post process function other than the cutting function. An example of the post function other than the cutting function in the printing device 24 is a stapling function (see FIG. 1).

The function devices (hereinafter may be simplified as "device(s)") 25 are post processing devices necessary in a post process. As examples of the post processing devices, FIG. 1 illustrates a cutting device and a stapling device.

A client operates the client PC 10 so that the client PC 10 transmits input manuscript data (hereinafter may be simplified as "manuscript data") to the management server 21. The manuscript data include printing data and printing conditions of the printing to be printed. By transmitting the "manuscript data, the client PC 10 sends a printing request to the management server 21.

Upon receiving the printing request from the client PC 10, the management server 21 performs management processes including the management of the manuscript data, the estimation of the printing operations, the management of the delivery schedule (deadline) of the purchased printing outputs, and the delivery of the printing output.

Further, by using a JDF generation application and the like, the management server 21 generates the JDF based on the printing conditions which become necessary to generate the printing output to be printed according to the request from the client.

By operating the functions of the print control system, the operator causes the print control system application server 22 to acquire the JDF and the printing data from the management server 21. Based on the acquired JDF and printing data, the print control system application server 22 assembles the operations in necessary processes as the workflow, and generates the print job. The print control system application server 22 causes the printing device 24 to print by controlling the printing device 24 so as to print the print job.

The print control system application server 22 may cause the printing device 24 to use the stapling function of the printing device 24 to staple the printing output. Further, the print control system application server 22 may cause (use) the cutting device or the stapling device as an example of the function device 25 to cut or staple the printing output.

Hardware Configuration of Print Control System Application Server 22

Figure 2:
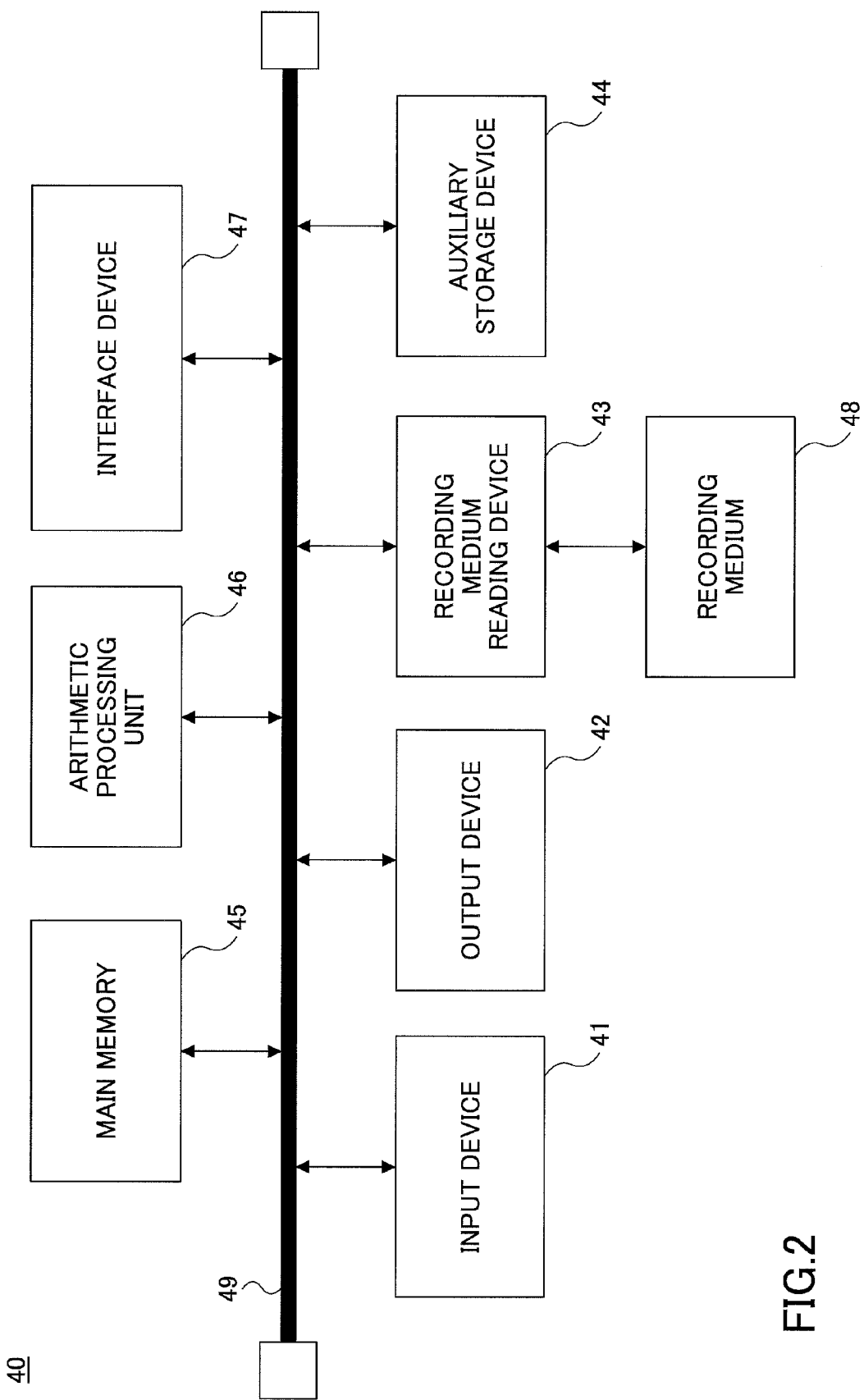
FIG. 2 is an example block diagram of a hardware configuration of a personal computer (PC) used in the print control system of FIG. 1.

The print control system application server 22 may be provided (achieved) by a PC 40 having a hardware configuration as illustrated in FIG. 2. FIG. 2 illustrates an example hardware configuration of the PC 40. As illustrated in FIG. 2, the PC 40 includes an input device 41, an output device 42, a recording medium reading device 43, an auxiliary storage device 44, a main memory 45, an arithmetic processing unit 46, and an interface device 47, which are connected to each other via a bus 49.

The input device 41 may be a keyboard, a mouse and the like. The input device 41 is used to input various (input) signals. The output device 42 may be a display device and the like. The output device 42 is used to display various windows, data and the like. The interface device 47 may be a modulator-demodulator (MODEM), a LAN card and the like. The interface device 47 is used to connect to the network 26.

A print control program installed in the print control system application server 22 is at least a part of various programs controlling the PC 40. The print control program may be provided by, for example, delivering a recording medium 48 or downloading via the network 26 or the like.

As the recording medium 48, various types of recording media may be used such as recording media optically, electronically, or magnetically recording data such as a CD-ROM, a flexible disk, an optical disk and the like and semiconductor memories electronically recording data such as a ROM, a flash memory and the like.

By setting (placing) the recording medium 48 including the print control program in the recording medium reading device 43, the print control program is installed (loaded) in the auxiliary storage device 44 from the recording medium 48 via the recording medium reading device 43. The print control program downloaded via the network 26 or the like may be installed in the auxiliary storage device 44 via the interface device 47.

The auxiliary storage device 44 stores the print control program, necessary files and data, and the like. Before being executed, the print control program is loaded from the auxiliary storage device 44 to the main memory 45 so that the main memory 45 stores the print control program. Further, according to the print control program stored in the main memory 45, the arithmetic processing unit 46 executes various processes described below.

Functional Configuration

Figure 3:
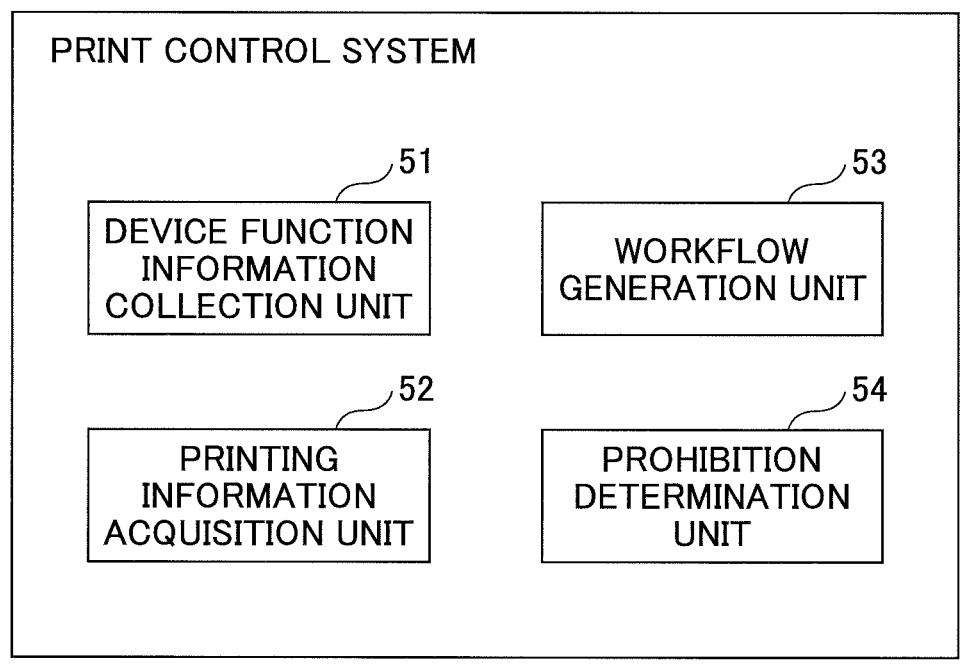
FIG. 3 is an example functional block diagram of the print control system.

In a case of the print control system 20 as illustrated in FIG. 1, the print control system application server 22 may have process blocks (functional blocks) as illustrated in FIG. 3. FIG. 3 is a process block diagram illustrating an example print control system according to an embodiment. In FIG. 3, process blocks for which description may not be necessary in this embodiment are herein omitted.

As described above, the print control program is installed (stored) in the print control system application server 22. By executing the print control program, the print control system application server 22 realizes (provides) a device function information collection unit 51, a printing information acquisition unit 52, a workflow generation unit 53, and a prohibition determination unit 54 as illustrated in FIG. 3.

The device function information collection unit 51 collects (acquires) data indicating the capabilities (functions) and the like of the printing device 24 and the function devices 25 as device functional information. The printing information acquisition unit 52 acquires data of the printing output to be generated as printing information.

The workflow generation unit 53 generates a workflow by connecting operational steps from receiving (inputting) a manuscript of the printing to generating the printing output. The prohibition determination unit 54 determines prohibitions as described below.

More specifically, the device function information collection unit 51 collects (acquires) various information items as the device functional information, the information items indicating the device (type) of the printing device 24 and the function devices 25, capabilities (functions) of the devices, the sizes of the provided sheets and the like.

The printing information acquisition unit 52 collects (acquires) information items of the finally generated printing product as the printing information, the information items indicating the sheet size and whether the printing product is to be stapled.

The workflow generation unit 53 generates a workflow based on, for example, the device functional information collected by the device function information collection unit 51, the printing information collected by the printing information acquisition unit 52, and the prohibitions determined by the prohibition determination unit 54.

The prohibition determination unit 54 determines a function that is not to be selected ("unselectable function") based on prohibition information indicating prohibition and ordering of the combinations of the devices having capabilities (functions) acquired from the devices.

Namely, the prohibition information indicates, for example, the prohibited combination of the functions of the devices (function devices) and prohibited order of performing the functions of the devices (function devices).

For example, when a client requests A4 size printing, the prohibition determination unit 54 may determine different unselectable functions depending on whether the A4 size sheet is stored (provided) in the printing device 24 or the A4 size sheet is generated (provided) by cutting a sheet stored (provided) in the printing device 24.

In other words, the prohibition determination unit 54 may determine different prohibitions to be set (applied) depending on whether a sheet (sheets) stored (provided) in the printing device 24 can be directly used (without cutting the sheet) or a sheet(sheets) stored (provided) in the printing device 24 is (necessarily) cut before being used.

Flow of Processes

Figure 4:
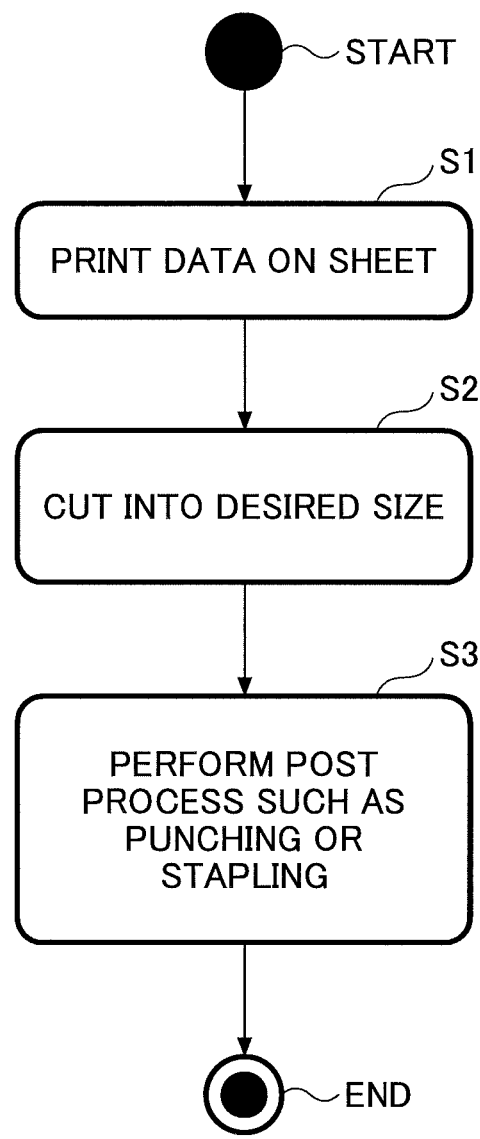
FIG. 4 is a flowchart of an operating process when a sheet stacked in a printing device is cut and used.

In a case where a sheet having a size desired by a client is not stored in the printing device 24 and a sheet stored in the printing device 24 is cut and used, the print control system 20 generates a workflow including operational steps as illustrated in the flowchart of FIG. 4, and performs processes in accordance of the generated workflow.

In the following, a case is described where the size of the sheet desired (requested) by the client is A4 and the size of the sheet to be cut into the sheet having A4 size desired by the client is A3.

FIG. 4 is a flowchart illustrating an example of the operational steps when a sheet having a size stored in the printing device 24 is cut and used. In step S1, the printing device 24 does not store the sheet having a size (i.e., A4 size) desired by the client but does store the sheet having another size (i.e., A3 size) that may be cut to generate the A4 size sheet. Therefore, the print data corresponding to two pages of the A4 size sheet are printed on a single A3 size sheet in 2Up mode.

Further, the print control system 20 determines whether the sheet having a size provided in the printing device 24 may be cut and generates the sheet having a size desired by the client based on a Table as illustrated in FIG. 5. FIG. 5 is an example Table illustrating combinations between the sheet size before cutting and the corresponding sheet size(s) after cutting.

The Table of FIG. 5 illustrates corresponding relationships between the sheet size before cutting and the sheet size(s) that may be generated by cutting the sheet size before cutting. Namely, according to the table of FIG. 5, for example, a sheet having A4 and A5 sizes may be generated by cutting a sheet having A3 size. Therefore, by using the Table of FIG. 5, the print control system 20 determines that the A4 size sheet may be generated by cutting the A3 size sheet.

In other words, by referring to the Table of FIG. 5, the print control system 20 determines that the sheet having the A4 size desired by the client may be generated by cutting the sheet having the A3 size stored (provided) in the printing device 24.

In step S2, the function device 25 which is the cutting device cuts the A3 size sheet on which the print data of two pages of A4 size sheets are printed in the 2Up mode, and generates the printing output having two pages of A4 size sheets.

In step 3, the function device 25 which is the stapling device performs a post process (bookbinding process) including, for example, a punching process, stapling process, a folding process and the like to generate the printing output.

Further, according to the flowchart of FIG. 4, the sheet having the A4 size desired by the client is generated by cutting, the prohibition is set to prevent (prohibit) the execution of any of the post processes other than the cutting process before the cutting process is performed by the function device 25 of the cutting device.

For example, in the case of the print control system 20 of FIG. 1, the use of the stapling function of the printing device 24 is prevented (prohibited) by the prohibition, so that the stapling operation (function) is performed by the function device 25 of the stapling device after the cutting operation is performed by the function device 25 of the cutting device.

Figure 6C:
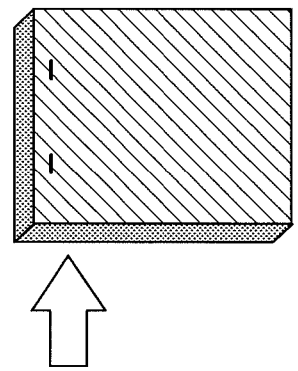
FIGS. 6A through 6C are conceptual drawings illustrating an example transition of a form of printing output.
Figure 6B:
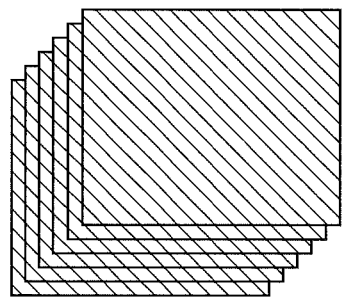
Figure 6A:
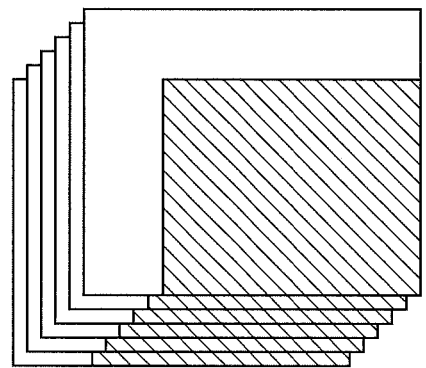

FIGS. 6A through 6C conceptually illustrate the transitions of the shape of the printing output. In FIGS. 6A through 6C, it is assumed that there are no sheets having a size desired by the client stored (provided) in the printing device 24.

More specifically, FIGS. 6A through 6C conceptually illustrate the transitions of the printing output from the printing device 24, the function device 25 of the cutting device (hereinafter may be simplified as a "cutting device"), and the function device 25 of the stapling device (hereinafter may be simplified as "stapling device"), respectively.

FIG. 6A conceptually illustrates the printing output from the printing device 24. For example, one page of the printing output of FIG. 6A is formed (generated) by printing the print data corresponding to one page of A4 size on the A3 size sheet in 1Up mode, and other pages are also printed in the same manner. In FIG. 6A, the shaded parts correspond to the areas where the print data of one page of A4 size are printed.

FIG. 6B conceptually illustrates the printing output from the cutting device. The printing output of FIG. 6B is formed (generated) by cutting the printing output of FIG. 6A so as to retain only the shaded parts corresponding to the A4 size part.

Further, FIG. 6C conceptually illustrates the printing output from the stapling device. For example, FIG. 6C illustrates stapling the printing output which is generated by cutting by the cutting device.

As illustrated in FIGS. 6A through 6C, in the print control system in this embodiment, due to the prohibition, the stapling function of the printing device 24 is not to be used. Instead, the printing output is stapled by the stapling device after the printing output is cut by the cutting device. Based on the procedure above, the printing output is generated.

Figure 7:
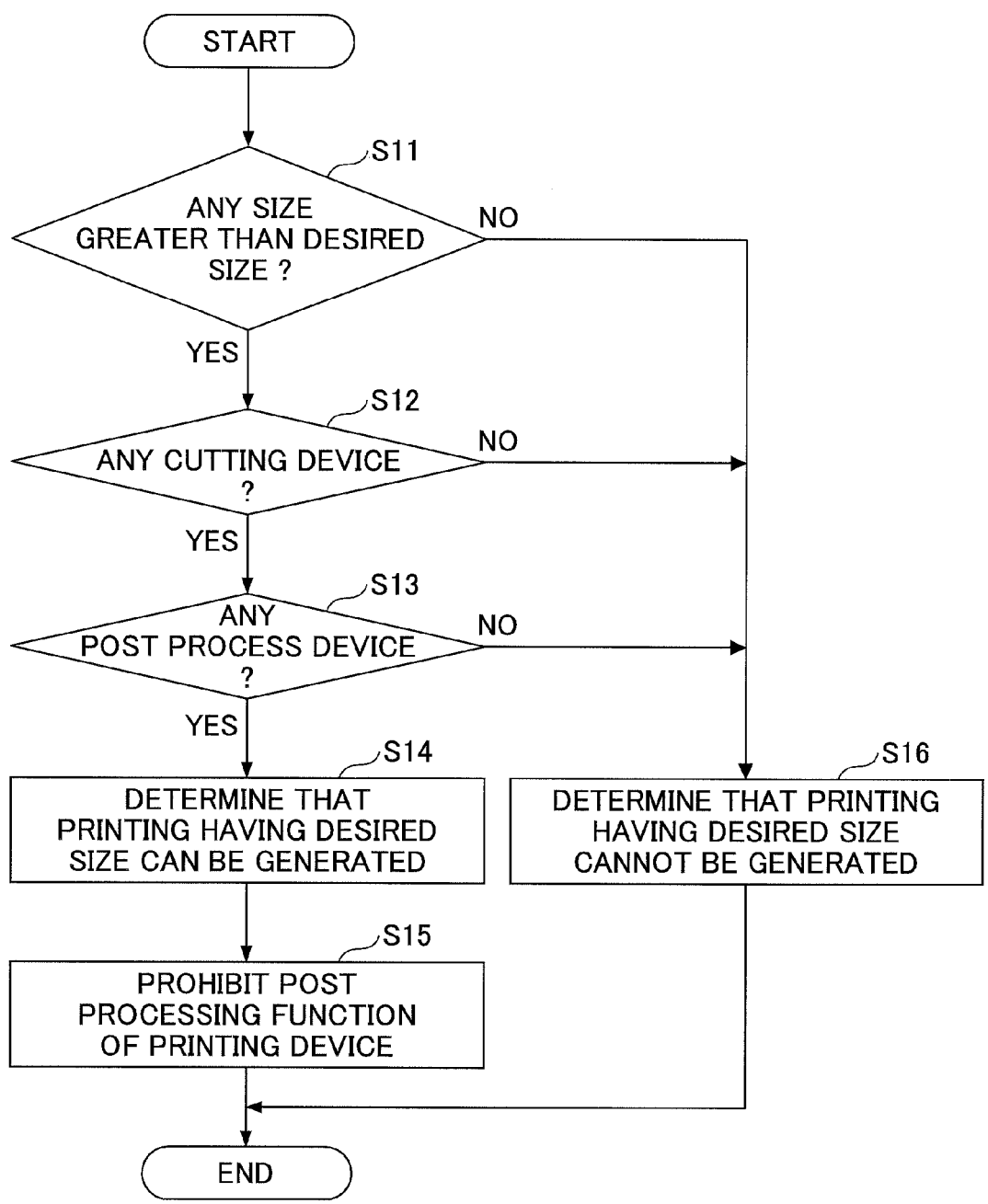
FIG. 7 is a flowchart of an operating process including determination whether a desired size of printing may be formed (provided) by cutting a provided sheet.

Further, the print control system 20 may determine whether the sheet having the size desired by the client may be generated by cutting based on the process as illustrated in FIG. 7. FIG. 7 is a flowchart of an example process of determining whether the sheet having the size desired by the client may be generated by cutting. Therefore, the process of the flowchart of FIG. 7 is performed when there is no sheet having the size desired by the client in the printing device 24.

In step S11, the print control system 20 determines whether a sheet having a size greater than the size of the sheet desired by the client is stored (provided) in the printing device 24. For example, the print control system 20 determines whether a sheet having a size greater than or equal to A3 as the sheet having a size greater than A4 is stored (provided) in the printing device 24.

When determining that a sheet having a size (e.g., A3 size) greater than the size (e.g., A4 size) of the sheet desired by the client is stored in the printing device 24, in step S12, the print control system 20 determined whether the print control system 20 includes the cutting device.

When determining that the cutting device is included in the print control system 20, in step S13, the print control system 20 determined whether there is a post processing device other than the cutting device in the print control system 20.

When determining that there is a post processing device other than the cutting device in the print control system 20, in step S14, the print control system 20 determines that it is possible to generate the printing output having the size desired by the client.

Further, in step S15, the print control system 20 prevents (prohibits) the stapling function as an example of the post process function of the printing device 24. By doing this, it may become possible to prevent (prohibit) the performance of the post process function other than the cutting process before the cutting is performed by the cutting device.

Further, when determining that there are no sheets having a size greater than the size of the sheet desired by the client in step S11, when determining that the print control system 20 does not include the cutting device in step S12, or when determining that the print control system 20 does not include any post processing device other than the cutting device in step S13, in step S16, the print control system 20 determines that it is not possible to generate the printing output having the size desired by the client unless the sheet stored in the print control system 20 is changed to have an adequate size.

According to an embodiment, in a case where it is possible for an operator to generate a sheet having a size designated by the operator to generate the printing output by cutting the sheets stored in the printing device 24, even when the printing device 24 includes a post processing device other than the cutting device, by setting the prohibition, it may become possible to prevent (prohibit) the performance of the post processing device other than the cutting device in the post processes of the printing device 24 before the cutting is performed.

Further, it should be noted that the elements according to an embodiment, the expressions according to an embodiment, or a combination of the elements may be effectively applied to a method, a device, a system, a computer program, a recording medium, and a data structure as embodiments of the present invention.

According to an embodiment, it may become possible to provide a print control device, a print control system, a print control program, and a recording medium storing the print control program which prevent the execution of a post processing function other than the cutting process before the sheets are cut.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

Further, the sheet stored (provided) in the printing device 24 is not limited to the sheet that is practically stored in the printing device 24.

Namely, the sheet may be stored in a sheet feeding device connected to the printing device 24, so that the sheet stored in the sheet feeding device may be fed to the printing device 24.

What is claimed is:

1. A print control device comprising:
    a prohibition determination unit configured to, when a first sheet size of a sheet stored in a printing device is different from a second sheet size designated by an operator to generate a printing output and,
        determine whether the second sheet size of a sheet can be generated by cutting the sheet having the first sheet size stored in the printing device, and
        prevent, when determining that the second sheet size of the sheet can be generated by cutting the sheet having the first sheet size, an execution of a post process function other than cutting in the printing device; and
    a workflow generation unit configured to generate a workflow including operational steps of:
        arranging drawing data of the printing output on the sheet having the first sheet size so that the drawing data arranged are adapted to the second sheet size when the sheet of the first size is not available,
        causing the printing device to print the drawing data,
        causing a cutting device to cut the sheet having the first sheet size to obtain the sheet having the second sheet size, and
        causing a post-processing device other than the cutting device to perform the post process function on the printing output after cutting the sheet having the first sheet size.

2. The print control device according to claim 1,
    wherein the prohibition determination unit is configured to determine whether the second sheet size of a sheet can be generated by cutting the sheet having the first sheet size stored in the printing device based on a table indicating a relationship between the first sheet size and the second sheet size.

3. The print control device according to claim 1,
    wherein the prohibition determination unit is configured to determine that the second sheet size of the sheet can be generated by cutting the sheet having the first sheet size stored in the printing device in a case where the first sheet size is greater than the second sheet size, there is a usable cutting device to cut the sheet having the first sheet size, and there is a function device other than a device cutting the sheet, the function device performing the post process function on the printing output.

4. The print control device according to claim 1, wherein the post-processing device is connected to the print control device and the workflow generation unit is further configured to generate the workflow based on a function of the connected post-processing device.

5. A non-transitory computer-readable storage medium with an executable program stored therein, wherein the program instructs a computer to perform as the following units:
    a prohibition determination unit configured to, when a first sheet size of a sheet stored in a printing device is different from a second sheet size designated by an operator to generate a printing output,
        determine whether the second sheet size of a sheet can be generated by cutting the sheet having the first sheet size stored in the printing device, and
        prevent, when determining that the second sheet size of the sheet can be generated by cutting the sheet having the first sheet size, an execution of a post process function other than cutting in the printing device; and
    a workflow generation unit configured to generate a workflow including operational steps of:
        arranging drawing data of the printing output on the sheet having the first sheet size so that the drawing data arranged are adapted to the second sheet size when the sheet of the first size is not available,
        causing the printing device to print the drawing data,
        causing a cutting device to cut the sheet having the first sheet size to obtain the sheet having the second sheet size, and
        causing a post-processing device other than the cutting device to perform the post process function on the printing output after cutting the sheet having the first sheet size.

6. The non-transitory computer-readable storage medium according to claim 5,
wherein the prohibition determination unit is configured to determine whether the second sheet size of a sheet can be generated by cutting the sheet having the first sheet size stored in the printing device based on a table indicating a relationship between the first sheet size and the second sheet size.

7. The non-transitory computer-readable storage medium according to claim 5,
wherein the prohibition determination unit is configured to determine that the second sheet size of the sheet can be generated by cutting the sheet having the first sheet size stored in the printing device in a case where the first sheet size is greater than the second sheet size, there is a usable cutting device to cut the sheet having the first sheet size, and there is a function device other than a device cutting the sheet, the function device performing the post process function on the printing output.

8. A print control system comprising:
the non-transitory computer-readable storage medium according to claim 5; and
an image forming apparatus.

9. The non-transitory computer-readable storage medium according to claim 5, wherein the post-processing device is connected to the computer and the workflow generation unit is further configured to generate the workflow based on a function of the connected post-processing device.

* * * * *